(12) United States Patent
Chiang et al.

(10) Patent No.: US 9,152,611 B2
(45) Date of Patent: Oct. 6, 2015

(54) TRUST-TECH ENHANCED METHODS FOR SOLVING MIXED-INTEGER OPTIMIZATION PROBLEMS

(71) Applicant: Bigwood Technology Inc., Ithaca, NY (US)

(72) Inventors: Hsiao-Dong Chiang, Ithaca, NY (US); Tao Wang, Ithaca, CA (US); Bin Wang, Ithaca, NY (US)

(73) Assignee: Bigwood Technology, Inc., Ithaca, NY (US)

( * ) Notice: Subject to any disclaimer, the term of this patent is extended or adjusted under 35 U.S.C. 154(b) by 250 days.

(21) Appl. No.: 13/954,634

(22) Filed: Jul. 30, 2013

(65) Prior Publication Data

US 2015/0039663 A1 Feb. 5, 2015

(51) Int. Cl.
*G06N 99/00* (2010.01)
*G06F 17/11* (2006.01)

(52) U.S. Cl.
CPC .............. *G06F 17/11* (2013.01); *G06N 99/005* (2013.01)

(58) Field of Classification Search
CPC ..................................................... G06N 99/005
See application file for complete search history.

(56) References Cited

U.S. PATENT DOCUMENTS

| 5,483,462 | A  | 1/1996  | Chiang |
| 7,050,953 | B2 | 5/2006  | Chiang |
| 7,277,832 | B2 | 10/2007 | Chiang |

OTHER PUBLICATIONS

Wang et al, Toward the development of a Trust-Tech-based methodology for solving mixed integer nonlinear optimization, Nonlinear Theory and Its Applications (NOLTA) IEICE 2011, vol. 2, No. 3, pp. 281-301.
Land, et al., "An automatic method of solving discrete programming problems", Econometrica, vol. 28, No. 3, pp. 497-520, Jul. 1960.
Padberg, et al., "Optimization of a 532-city symmetric traveling salesman problem by branch and cut", Operations Research Letters, vol. 6, No. 1, pp. 1-7, Mar. 1987.
Tawarmalani, et al,, "A polyhedral branch-and-cut approach to global opti-mization", Mathematical Programming, vol. 103, No. 2, pp. 225-249, 2005.
Lee, et al., "A dynamical trajectory-based methodology for systematically computing multiple optimal solutions of general nonlinear programming problems", IEEE Trans. Autom. Control, vol. 49, pp. 888-899, 2004.

*Primary Examiner* — Kakali Chaki
*Assistant Examiner* — Vincent Gonzales
(74) *Attorney, Agent, or Firm* — The Law Office of Tong Lee

(57) ABSTRACT

A dynamical method and system generate a global optimal solution to a mixed integer nonlinear programming (MINLP) problem, where a part or all of optimization variables of the MINLP problem are restricted to have discrete values. The method computes a first integer solution to the MINLP problem with a given starting point using an MINLP solver; computes a set of stable equilibrium points (SEPs) of a nonlinear dynamical system associated with a relaxed continuous problem of the MINLP problem, where the SEPs surround the first integer solution and form one or more tiers; identifies from the SEPs a set of new starting points for the MINLP problem; computes integer solutions to the MINLP problem with progressively tightened bounds, starting from the new starting points using the MINLP solver; and generates the global optimal solution based on the integer solutions after one or more iterations.

20 Claims, 8 Drawing Sheets

Step 3

Step 1

Step 2

Step 3

Step 4

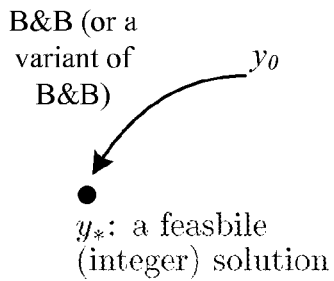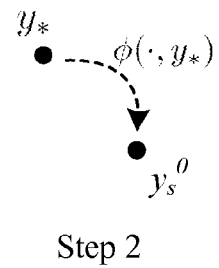
Step 1  FIG. 8
Step 2  FIG. 9
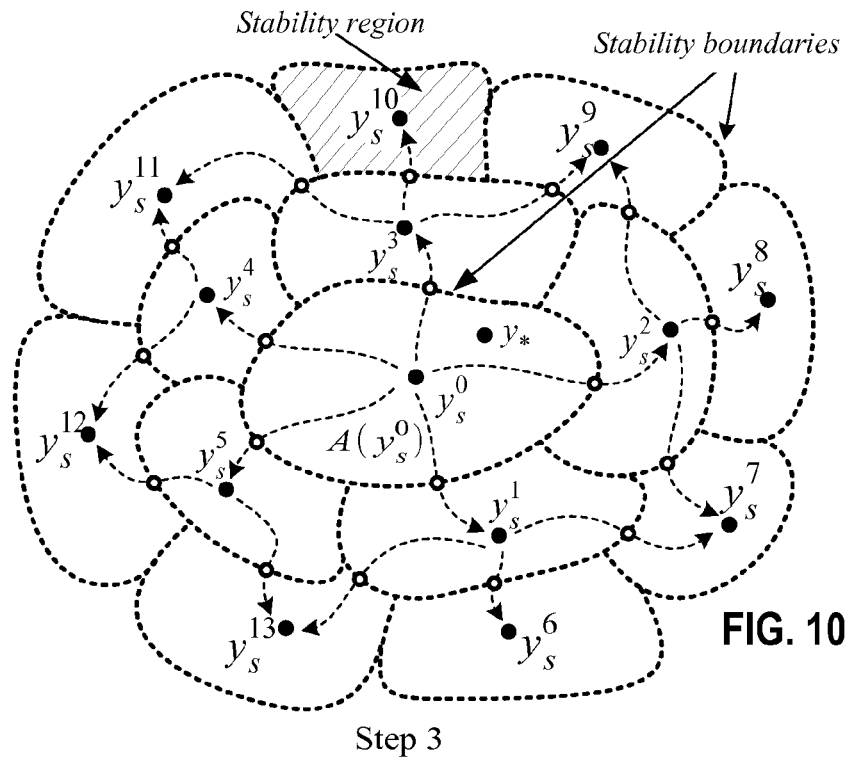
Step 3
FIG. 10
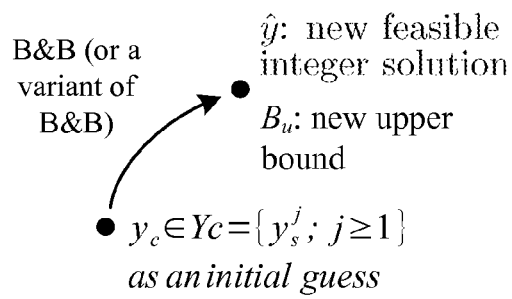
Step 4
FIG. 11

TRUST-TECH ENHANCED METHODS FOR SOLVING MIXED-INTEGER OPTIMIZATION PROBLEMS

TECHNICAL FIELD

Embodiments of the invention pertain to the field of mathematical analysis and modeling, nonlinear programming and optimization technology. More particularly, the invention pertains to dynamical methods for obtaining global optimal solutions to mixed integer nonlinear programming (MINLP) problems.

BACKGROUND

Many theoretical and practical problems can be formulated as a general constrained nonlinear optimization problem of the following form:

$$\min \quad f(x) \quad (1.1)$$
$$\text{s.t} \quad h_i(x) = 0, i \in \mathcal{E} = \{1, \ldots, n_\mathcal{E}\}$$
$$g_j(x) \leq 0, j \in \mathcal{J} = \{1, \ldots, n_\mathcal{J}\}$$
$$x \in R^n$$

where the objective function f(x), the nonlinear equality constraints $h_i(x)$, $i \in \mathcal{E} = \{1, \ldots, n_\epsilon\}$ and the nonlinear inequality constraints $g_j(x)$, $j \in J = \{1, \ldots, n_J\}$ are all twice differentiable; that is, they all belong to $C^2: R^n \to R$. It is noted that maximization problems are also readily covered by (1.1) since $$\max f(x)$$

is equivalent to $$\min -f(x).$$

Therefore, without loss of generality, only minimization will be considered in the following description of the optimization problems. Because of the nonlinearity and nonconvexity of the objective and constraint functions, a real world problem usually contains many local optimal solutions. Thus, obtaining a global optimal solution to (1.1) is of primary importance in real applications. Complexity of the problem (1.1) will be dramatically increased if a part or all of the optimization variables x are restricted to take a value from an associated set of discrete values which are usually integer values. These optimization problems can be formulated as a mixed integer nonlinear programming (MINLP) problem of the following form:

$$\min \quad f(x, y) \quad (1.2)$$
$$\text{s.t} \quad h_i(x, y) = 0, i \in \mathcal{E} = \{1, \ldots, n_\mathcal{E}\}$$
$$g_j(x, y) \leq 0, j \in \mathcal{J} = \{1, \ldots, n_\mathcal{J}\}$$
$$x \in R^n, y \in Z^m$$

MINLP has found a variety of important applications in science and engineering, including the electrical and biological engineering and the operations-research (OR) practice. For instance, the telecommunication network design and optimization, DNA data compression, traveling-salesman problems, resource allocation and constraint satisfaction problems, network reconfiguration in power grids and service restoration in distribution systems can all be formulated as MINLPs. However, even for linear objective and constraint functions in (1.2), the number of local optimal solutions to the optimization problem (1.2) usually grows exponentially as the number of integral variables y increases. As a result, the existence of multiple local optimal solutions, the number of which is typically unknown, to the optimization problem (1.2) is not only due to the nonlinearity and nonconvexity of the objective and constraint functions, but also due to the integral restriction over the variables y. Combined effects of these properties render solving the MINLP problem (1.2) a very difficult task and it is very challenging to find the global optimal solution to the MINLP problem (1.2). Indeed, many MINLP problems are classified as NP-hard problems.

There has been a wealth of research efforts focused on developing effective and robust methods to solve the MINLP problem (1.2). These methods include numerous deterministic schemes and intelligent techniques which have been brought forward in the past decades. In 1960 a general algorithm Branch-and-Bound (B&B) was proposed by A. H. Land and A. G. Doig for discrete optimization. Later on a more powerful hybrid method Branch-and-Cut (B&C) was proposed in the 1990's, which incorporated the cutting-plane method with B&B. In comparison with B&B, the method B&C usually returns high quality solutions with less time-consumption. This is mainly because the cutting plane component shortens the process to obtain an integer solution, and in turn a larger number of sub-problems can be discarded as fruitless candidates in an earlier stage. It has been noticed that only the upper bounds are considered in conventional B&B method. In fact, properly designed lower bounds can also be involved in the search procedure, resulting a faster shrink of the search space. To this end, another variant called Branch-and-Reduce (B&R) method was proposed by M. Tawarmalani and N. V. Sahinidis, where lower bounds were computed and updated by successive convex under-approximations of a relaxed problem for the MINLP problem (1.2).

With an aim to achieve better performance of B&B, many hybrid methods have been proposed where B&B is integrated with heuristic search algorithms, such as evolutionary algorithms, particle swarm optimization, ant colony, and simulated annealing. It is worthwhile noting that the actual effects of these methods can be both positive and negative. On one hand, these methods have advantages of wide applicability, easy-parallelization and robustness in the quality of solution. On the other hand, however, these methods can still suffer from several drawbacks; in particular, the accuracy of solutions obtained within limited time cannot be predicted and a global-optimal solution is not guaranteed.

SUMMARY

According to one embodiment of the invention, a method generates a global optimal solution to a mixed integer nonlinear programming (MINLP) problem, where a part or all of optimization variables of the MINLP problem are restricted to have discrete values. The method computes a first integer solution to the MINLP problem with a given starting point using an MINLP solver; computes a set of stable equilibrium points (SEPs) of a nonlinear dynamical system associated with a relaxed continuous problem of the MINLP problem, where the SEPs surround the first integer solution and form one or more tiers; identifies from the SEPs a set of new starting points for the MINLP problem; computes integer solutions to the MINLP problem with progressively tightened bounds, starting from the new starting points using the MINLP solver; and generates the global optimal solution based on the integer solutions after one or more iterations of computing the SEPs, identifying the new starting points and computing the integer solutions.

In another embodiment, a system generates a global optimal solution to an MINLP problem wherein a part or all of optimization variables of the MINLP problem are restricted to have discrete values. The system comprises one or more processors and one or more memory devices coupled to the one or more processors. The one or more processors are adapted to perform operations of a global optimizer to: compute a first integer solution to the MINLP problem with a given starting point using an MINLP solver; compute a set of stable equilibrium points (SEPs) of a nonlinear dynamical system associated with a relaxed continuous problem of the MINLP problem, wherein the SEPs surround the first integer solution and form one or more tiers; identify from the SEPs a set of new starting points for the MINLP problem; compute integer solutions to the MINLP problem with progressively tightened bounds, starting from the new starting points using the MINLP solver; and generate the global optimal solution based on the integer solutions after one or more iterations of computing the SEPs, identifying the new starting points and computing the integer solutions.

In yet another embodiment, a non-transitory computer readable storage medium includes instructions that, when executed by a processing system, cause the processing system to perform the aforementioned method for generating a global optimal solution to an MINLP problem wherein a part or all of optimization variables of the MINLP problem are restricted to have discrete values.

BRIEF DESCRIPTION OF THE DRAWINGS

Embodiments are illustrated by way of example and not limitation in the Figures of the accompanying drawings:

FIG. 8 illustrates a first step of a second dynamical method where a feasible integer solution is computed starting from an initial point by the B&B related method according to one embodiment.

FIG. 9 illustrates a second step of the second dynamical method where a local optimal solution of a relaxed continuous problem is computed starting from an integer solution by an existing continuous solver according to one embodiment.

FIG. 10 illustrates a third step of the second dynamical method where a set of neighboring SEPs in the dynamical system associated with the relaxed continuous problem is computed by a dynamical search procedure according to one embodiment.

FIG. 11 illustrates a fourth step of the second dynamical method where a new integer solution is computed starting from the best continuous solution by the B&B related method according to one embodiment.

DETAILED DESCRIPTION

Figure 1:
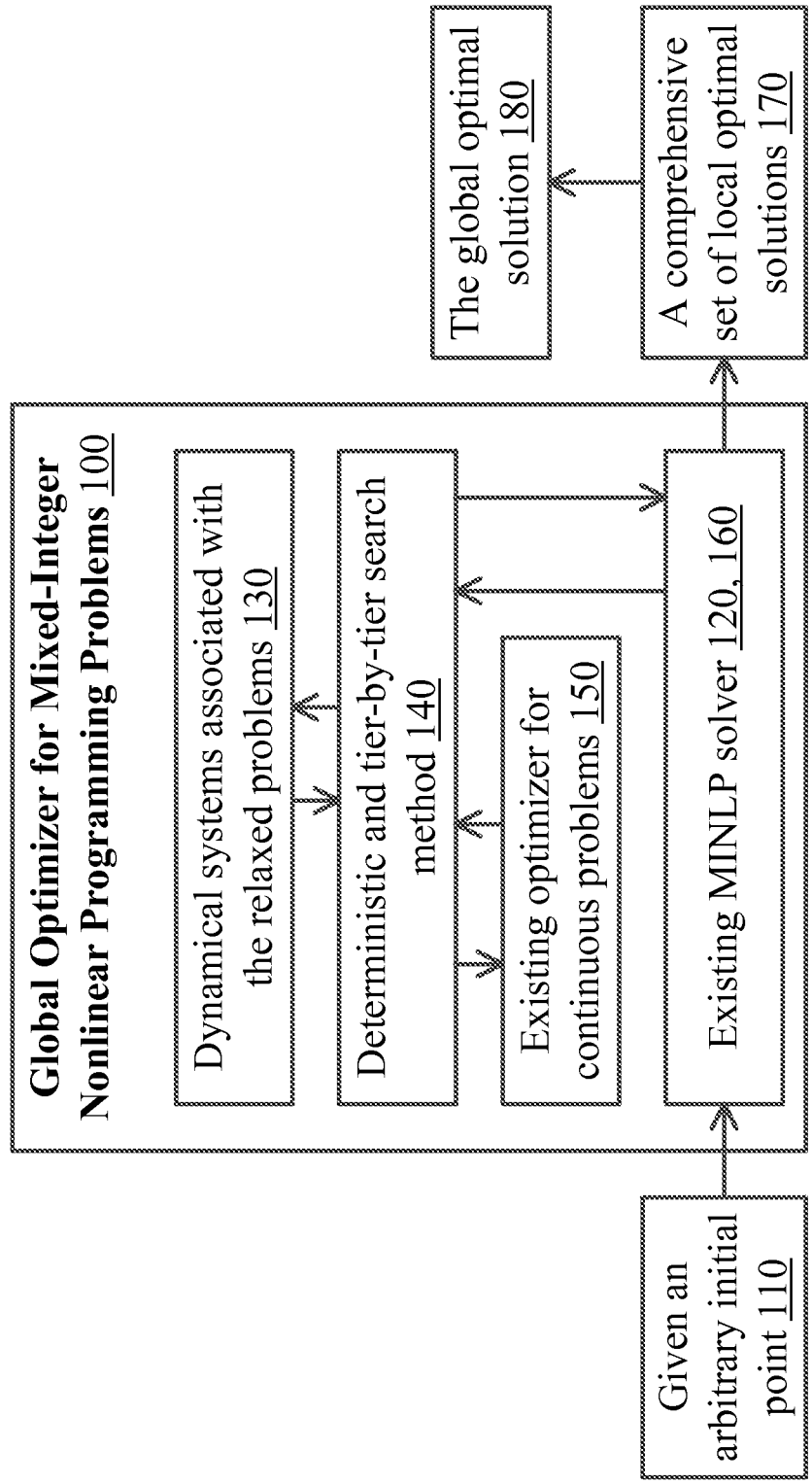
FIG. 1 is a diagram illustrating an overall architecture of a dynamical method for solving MINLP problems according to one embodiment.

Embodiments of the invention provide a systematic and dynamical method, which is deterministic in nature, for finding global optimal solutions to MINLP problems of the form (1.2). More specifically, a dynamical search method called TRUST-TECH is used to enhance the conventional MINLP solvers (also referred to as "existing MINLP solvers" or "MINLP solvers") to achieve improved solution quality. TRUST-TECH is a method rooted in theories of nonlinear dynamical systems and characterizations of stability region and stability boundaries. TRUST-TECH can solve continuous nonlinear optimization problems in a deterministic manner. TRUST-TECH achieves the goal of optimization by a systematic and tier-by-tier search, and computes a complete set of local optimal solutions to the optimization problem. The global optimal solution can be selected from the complete set of the local optimal solutions.

As mentioned above, for simplicity of the description and without loss of generality, only minimization optimization problems will be described. It is understood that TRUST-TECH can be applied to both minimization and maximization optimization problems. Moreover, it is understood that an "upper bound" is computed and updated in connection with a minimization optimization problem, whereas a "lower bound" is computed and updated in connection with a maximization optimization problem. Thus, in the following description, the term "upper bound" can be replaced by the term "lower bound" when maximization optimization problems are being solved by the methods described herein. Thus, the term "bound" as used herein represents an "upper bound" for minimization and a "lower bound" for maximization. An objective value is "superior" to a current bound when the objective value is less than a current upper bound, or when the objective value is greater than a current lower bound, depending on whether a minimization or a maximization optimization problem is being solved.

TRUST-TECH is a deterministic method in that, given an initial point and a set of search directions, the final output solution will be deterministic. In other words, if TRUST-TECH is executed for multiple times (on a same machine or different machines) given the same initial point and search directions, the resulted solution will be exactly the same. It is because there is no randomness embedded in TRUST-TECH. On the contrary, existing global optimization methods, such as genetic algorithm, particle swarm optimization, evolutionary programming, simulated annealing, etc., have embedded randomness as an indispensable and critical component in their search mechanisms, and therefore, cannot guarantee such deterministicness.

According to embodiments of the invention, conventional MINLP solvers may include, but are not limited to, the Branch-and-Bound (B&B) method and its variants. Examples of the variants of B&B include, but are not limited to, the Branch-and-Reduce (B&R) method, the Branch-and-Cut (B&C) method, and other variants as understood by a person of ordinary skill in the field of nonlinear dynamical systems. In one embodiment, an MINLP solver (e.g., the B&B method or its variant) is enhanced by TRUST-TECH in following manner. First, the B&B method completes a search and returns an integer solution with the corresponding upper bound. In a dynamical system $\dot{y}=F(y)$ associated with the relaxed continuous problem (e.g., MINLP formulation of the form (1.1)), the stable equilibrium point (SEP) to which the integer solution converges is computed. A vector $y_s$ is called an SEP if $F(y_s)=0$ and all eigenvalues of the Jacobian matrix $\nabla F(y_s)$ have negative real parts. Afterwards, TRUST-TECH is carried out to find a comprehensive set of multi-tier SEPs around the computed SEP. By starting from these multi-tier SEPs, B&B is carried out again to find more integer solutions, among which improved integer solutions and upper bounds can be obtained. The term "improved" herein means integer solutions with better objective values, such as lower objective function values for minimization problems, or higher objective function values for maximization problems. Numerical results on benchmark MINLP functions show that the TRUST-TECH enhanced B&B method shows significant improvement on solution quality compared to the B&B method.

The TRUST-TECH enhanced method has the following features:

1) The TRUST-TECH enhanced method is a dynamical method that solves MINLP problems whose objective and/or constraint functions can be nonlinear and nonconvex.

2) TRUST-TECH can incorporate any conventional MINLP solver by consistently improving the solution obtained by the conventional MINLP solver.

3) The TRUST-TECH enhanced method can compute a comprehensive set of local optimal solutions to the relaxed continuous sub-problems associated with the MINLP problem.

4) The TRUST-TECH enhanced method can compute the global optimal solution to the MINLP problem by progressively improving the upper bound and thus improving integer solutions produced by the MINLP solver.

TRUST-TECH Enhanced Methods for Mixed-Integer Nonlinear Programs. For convenience of description but without loss of generality, instead of referring to the general MINLP formulation of the form (1.2) with both continuous variables x and integer/discrete variables y, we refer to an alternative formulation of the form (2.1) with solely integer/discrete variables y. That is, solving the MINLP problem of the form (1.2) is equivalent to solving the problem of the form (2.1), without loss of generality. The problem of form (2.1) is also referred to the integer problem in the description herein, whereas the problem of the form (2.2) below is referred to as the associated relaxed continuous problem. It is noted that the term "relaxed" in the description herein refers to treating integer variables as continuous variables with integral constraints removed (i.e., the constraint is relaxed).

$$\min \quad f(y) \quad (2.1)$$
$$\text{s.t} \quad h_i(y) = 0, i \in \mathcal{E} = \{1, \ldots, n_\mathcal{E}\}$$
$$g_j(y) \leq 0, j \in \mathcal{J} = \{1, \ldots, n_\mathcal{J}\}$$
$$y \in Z^m$$

$$\min \quad f(y) \quad (2.2)$$
$$\text{s.t} \quad h_i(y) = 0, i \in \mathcal{E} = \{1, \ldots n_\mathcal{E}\}$$
$$g_j(y) \leq 0, j \in \mathcal{J} = \{1, \ldots, n_\mathcal{J}\}$$
$$y \in R^m$$

Solving a mixed-integer nonlinear programming (MINLP) problem of the form (2.1) usually involves solving a set of relaxed continuous sub-problems of the form (2.2). Because of the nonlinearity and nonconvexity of the objective and/or constraint functions, there can be many local optimal solutions of a relaxed continuous problem of the form (2.2). One reliable way to find the global optimal solution of the continuous optimization problem (2.2) is to first find all of the local optimal solutions. From these local optimal solutions, the global optimal solution can then be found. The global optimal solution can be found by the following two conceptual steps: (i) Start from an arbitrary point and compute a local optimal solution to the optimization problem (2.2). (ii) Move away from the local optimal solution and approach another local optimal solution of the optimization problem (2.2).

TRUST-TECH enhanced methods realize these two conceptual steps by using trajectories of a particular class of nonlinear dynamical systems. More specifically, TRUST-TECH enhanced methods accomplish the task of finding the global optimal solution by the following steps:

1) Construct a dynamical system such that there is a one-to-one correspondence between the set of local optimal solutions to the optimization problem (2.2) and the set of SEPs of the dynamical system; in other words, for each local optimal solution to the problem (2.2), there is a distinct SEP of the dynamical system that corresponds to it.

2) The task of finding all local optimal solutions can be accomplished by finding all SEPs of the constructed dynamical system and finding a complete set of local optimal solutions to the problem (2.2) among the complete set of SEPs.

3) Find the global optimal solution from the complete set of local optimal solutions.

TRUST-TECH enhanced methods are dynamical methods that can be used for solving MINLP problems to obtain a global optimal solution to the MINLP problems. FIG. 1 is a block diagram illustrating an embodiment of a global optimizer 100 (e.g., the TRUST-TECH enhanced method) for solving an MINLP problem of the form (2.1). According to FIG. 1, the global optimizer 100 can be implemented as the following conceptual procedure:

1) Given an arbitrary initial point (block 110) (the term "initial point" is also referred to as the "starting point"), apply an existing MINLP solver (block 120) to compute a feasible solution to the MINLP problem (2.1). The feasible solution is an integer solution where all integral variables are assigned proper integer values and all constraints are satisfied.

2) Construct a relaxed continuous problem of the form (2.2) for the MINLP problem (2.1), and construct a dynamical system associated with the relaxed problem (block 130).

3) Perform a deterministic, tier-by-tier dynamical search procedure (block 140) by incorporating an existing local continuous solver or optimizer (block 150) to compute a complete set of local optimal solutions to the relaxed continuous problem.

4) Use these local optimal solutions as initial points and apply the existing MINLP solver (block 160) to compute improved feasible solutions to the MINLP problem (2.1).

5) Compute a comprehensive set of local optimal solutions (block 170) (i.e., integer solutions) to the MINLP problem (2.1).

6) Identify the global optimal solution (block 180) to the MINLP problem (2.1) from the local optimal solutions.

FIG. 2 through FIG. 5 illustrate an embodiment of the TRUST-TECH enhanced method for solving an MINLP problem of the form (2.1). The method includes the following conceptual steps.

Figure 2:
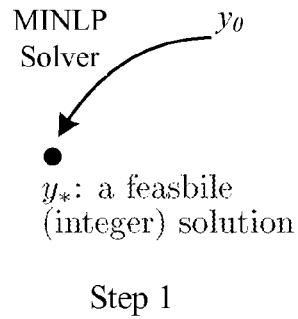
FIG. 2 illustrates a first step of a first dynamical method where a feasible integer solution is computed starting from an initial point by an existing MINLP solver according to one embodiment.

Step 1: Apply an existing MINLP solver to compute an integer solution y* of the MINLP problem of the form (2.1), as illustrated in FIG. 2.

Figure 3:
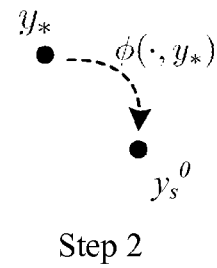
FIG. 3 illustrates a second step of the first dynamical method where a local optimal solution of a relaxed continuous problem is computed starting from an integer solution by a local continuous solver according to one embodiment.

Step 2: Compute the SEP $y_s^0$ to which the integer solution converges in the associated dynamical system of the relaxed continuous problem of the form (2.2); in other words, the integer solution y* is contained in the stability region of this SEP $y_s^0$ in the associated dynamical system, as illustrated in FIG. 3.

Figure 4:
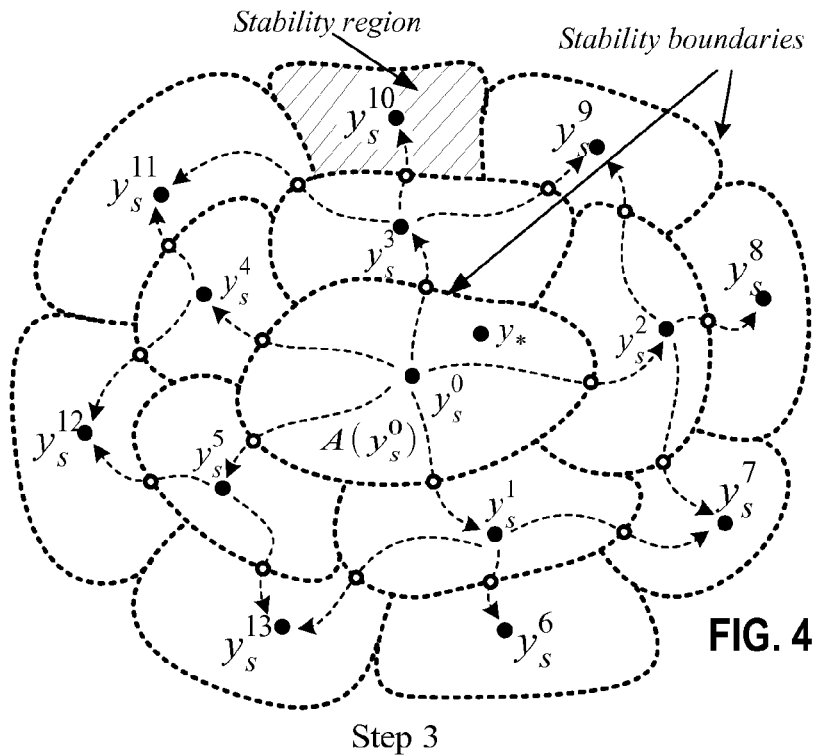
FIG. 4 illustrates a third step of the first dynamical method where a set of neighboring SEPs in the dynamical system associated with the relaxed continuous problem is computed by a dynamical search procedure according to one embodiment.

Step 3: Apply the TRUST-TECH dynamical search method to compute a collection Yc of multi-tier SEPs (also referred to as "a comprehensive set of SEPs") neighboring the SEP $y_s^0$ of step 2 in the associated dynamical system of the relaxed continuous problem of the form (2.2), as illustrated in the example of FIG. 4. This comprehensive set of SEPs is a set of neighboring local optimal solutions of the relaxed continuous problem. The example of FIG. 4 shows a set of multi-tier SEPs, which include an innermost SEP (e.g., $y_s^0$) surrounded by tiers of SEPs; e.g., the first-tier SEPs: $y_s^1, y_s^2, y_s^3, y_s^4, y_s^5$, and the second-tier SEPs: $y_s^6, y_s^7, y_s^8, y_s^9, y_s^{10}, y_s^{11}, y_s^{12}, y_s^{13}$. Each SEP is contained in a stability region defined by a stability boundary (shown in FIG. 4 as dotted lines). For example, the SEP $y_s^{10}$ is contained in a stability region shown in hatched lines, and $A(y_{s0})$ represents the stability region of the SEP $y_{s0}$. Like the SEPs, the stability regions are tiered, e.g., each of the first-tier SEPs is contained in a first-tier stability region, the each of the second-tier SEPs is contained in a second-tier stability region, and the innermost SEP is contained in an innermost stability region. The first-tier stability region is an inner-tier region relative to the second-tier stability region, while the second-tier stability region is an outer-tier stability region relative to the first-tier stability region. Although two tiers of SEPs are shown in the example of FIG. 4, it is understood that the collection Yc may contain any number of tiers of SEPs surrounding the innermost SEP, and likewise, any number of tiers of SEPs surrounding the integer solution. In some embodiments, the collection Yc may omit some of the SEPs surrounding the innermost SEP with no or negligible degradation to the final global optimal solution.

Figure 5:
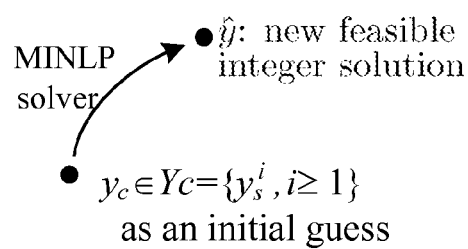
FIG. 5 illustrates a fourth step of the first dynamical method where a new improved integer solution is computed by an existing MINLP solver starting from a superior solution identified from the SEPs obtained in the third step according to one embodiment.

Step 4: Select an SEP $y_s^i$ in the collection Yc and starting from it compute another integer solution ŷ to the original MINLP problem (2.1) using the existing MINLP solver, as illustrated in FIG. 5.

Step 2 through step 4 can be repeated multiple times to consistently improve the solution quality of the existing MINLP solver, until no improvement can be achieved or the restrictions imposed on the computing time or computational resources have been reached.

Figure 6:
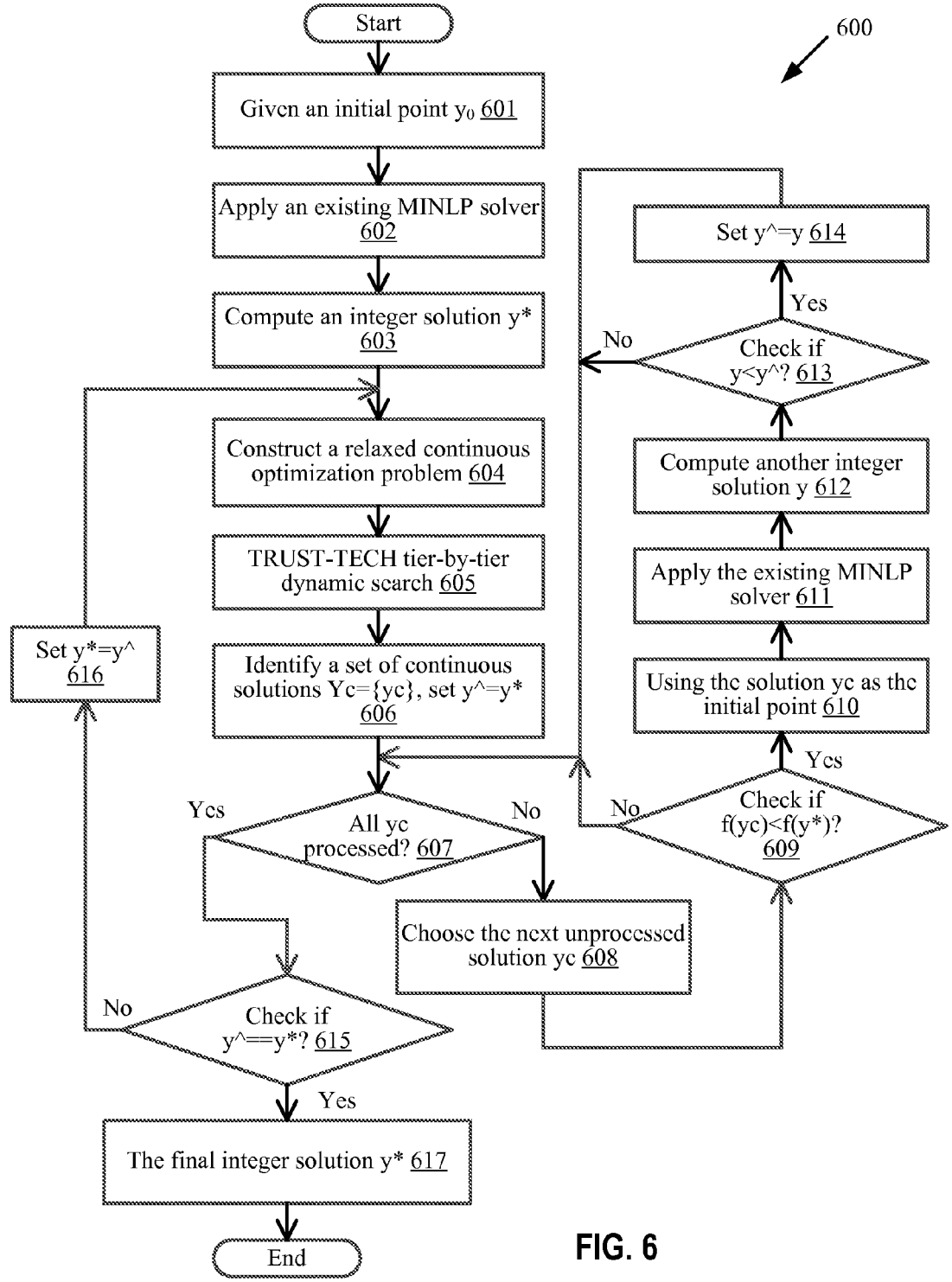
FIG. 6 illustrates a flow diagram of the first dynamical method for solving MINLP problems according to one embodiment.

FIG. 6 is a flow diagram illustrating an embodiment of a TRUST-TECH enhanced method 600 for obtaining a global optimal solution to the MINLP problem (2.1). The method 600 can be executed by software, hardware, firmware, or a combination thereof. In one embodiment, the TRUST-TECH enhanced method 600 is executed by a processing system such as a computer system. According to FIG. 6, in one embodiment, the method 600 begins with a given arbitrary initial point $y_0$ at step 601. The method proceeds to apply an existing MINLP solver at step 602 to compute a feasible solution (e.g., an integer solution) y* to the MINLP problem (2.1) at step 603, where all integral variables are assigned proper integer values and all constraints are satisfied. At step 604, the method then proceeds to construct a relaxed continuous problem of the form (1.1) for the MINLP problem (2.1).

Subsequently, at step 605, the method proceeds to perform a deterministic, tier-by-tier dynamical search procedure; e.g., the TRUST-TECH dynamical search method, which comprises the following conceptual steps: a) compute SEPs from starting points by incorporating existing local optimizers into the search, b) escape from stability regions of the SEPs and producing new starting points to avoid entrapment in local optimal solutions, on the constructed dynamical system; and c) obtain a complete set of SEPs of the dynamical system. Details of the TRUST-TECH dynamical search method will be described below with reference to FIG. 7.

Based on results of the TRUST-TECH dynamical search, the method proceeds to identify a complete set of local optimal solutions Yc={yc} to the relaxed continuous problem from the set of SEPs, and sets ŷ=y* at step 606. At step 607, the method proceeds to determine whether all local optimal solutions in Yc have been processed. If the set Yc is empty or all solutions in Yc have been processed, the method proceeds to step 615; otherwise the method proceeds to step 608. At step 608, a solution yc in Yc is chosen and Yc is updated by removing yc from it. At step 609, the method determines whether the objective value is acceptable; that is, whether f(yc)<f(ŷ). If f(yc)<f(ŷ), the method proceeds to step 610; otherwise, the method proceeds to step 607.

At step 610, the chosen solution yc in Yc is used as the initial point. The method applies the existing MINLP solver at step 611 to compute another integer solution y to the MINLP problem (2.1) at step 612. At step 613, it is determined whether or not the obtained integer solution is better than the current best solution; that is, whether y<ŷ. If y<ŷ, the method proceeds to step 614; otherwise, the method proceeds to step 607.

At step 614, the method proceeds to update the current best solution by setting ŷ=y. The method then proceeds to step 607.

If it is determined at step 607 that all local optimal solutions in Yc have been processed, it is further determined at step 615 whether or not the current best solution has been changed; that is, whether ŷ==y*. If ŷ==y*; that is, the best solution has been changed, the method proceeds to step 616; otherwise, the method proceeds to step 617.

At step 616, the method proceeds to set y*=ŷ. The method then proceeds to step 604 to start the next iteration of the global optimization. At step 617, the entire search is terminated and the final integer solution y* is generated as output.

Figure 7:
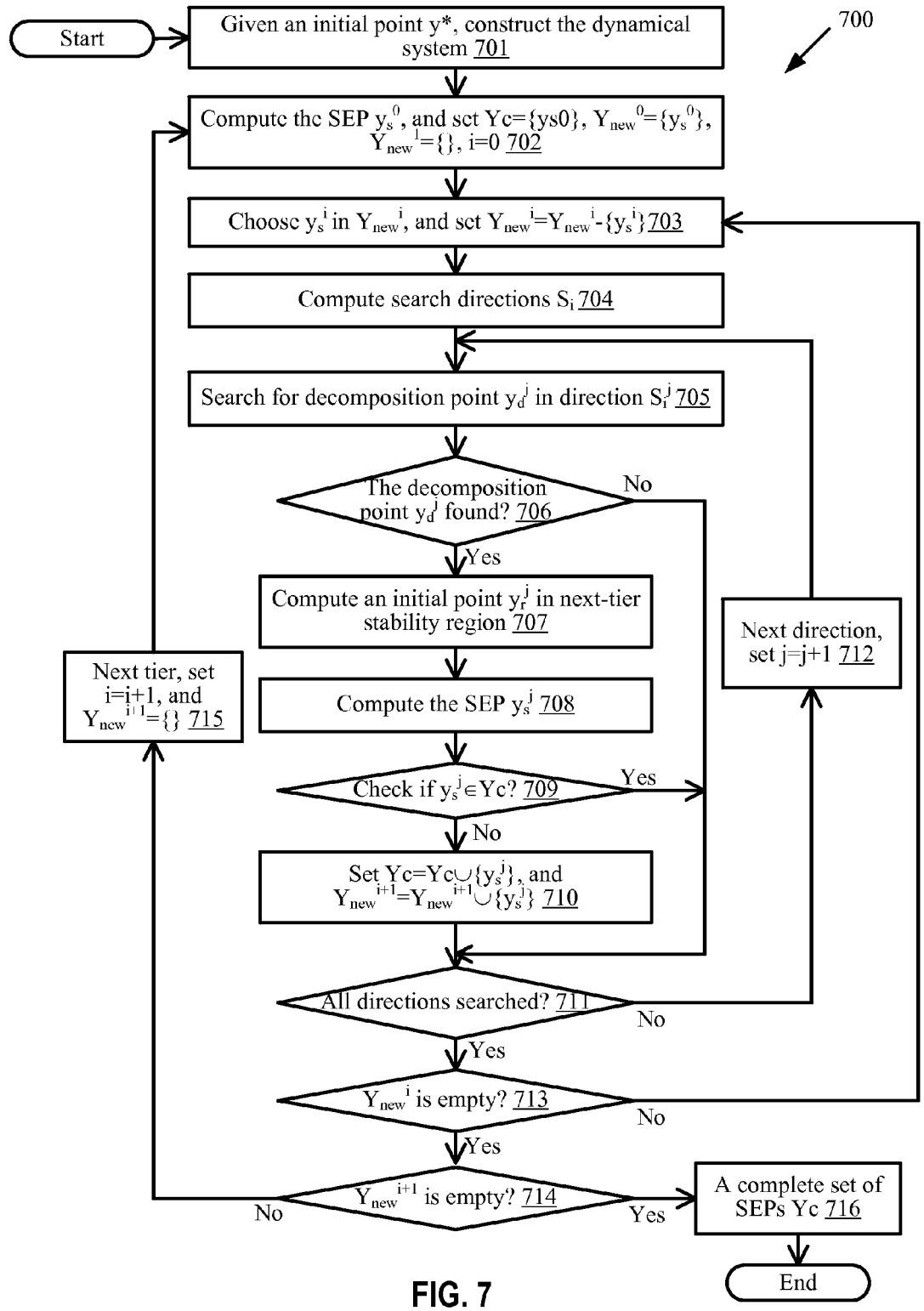
FIG. 7 illustrates a flow diagram of a dynamical search procedure for generating a comprehensive set of SEPs according to one embodiment.

The TRUST-TECH Dynamical Search Method. The TRUST-TECH dynamical search method is used to compute a complete set of local optimal solutions to a relaxed continuous sub-problem of the form (2.2), as described in step (605) of the embodiment of FIG. 6. FIG. 7 is a flow diagram illustrating an embodiment of the TRUST-TECH dynamical search method 700. The method 700 can be executed by software, hardware, firmware, or a combination thereof. In one embodiment, the method 700 is executed by a processing system such as a computer system. According to FIG. 7, in one embodiment, a computer system begins executing the method 700, with a given initial point y*, by constructing a dynamical system (701) associated with the relaxed optimization problem (2.2). At step 702, the method proceeds to apply a local continuous solver using the initial point y* to compute an initial SEP $y_s^0$ of the dynamical system, and set i=0, $Y_c=\{y_s^0\}$, $Y_{new}^i=\{y_s^0\}$, and $Y_{new}^{i+1}=\emptyset$ (i.e., empty set { }). At step 703, the method proceeds to choose $y_s^i$ in $Y_{new}^i$, and set $Y_{new}^i=Y_{new}^i-\{y_s^i\}$. For each SEP in $Y_{new}^i$, the method proceeds to steps 704-712 as follows.

At step 704, the method proceeds to compute a set of search directions $\{S_i^j, j=1, 2, \ldots, m_i\}$, and sets j=1. At step 705, the method proceeds to search a decomposition point $y_d^j$ along the search direction $S_i^j$. A decomposition point is a type-1 unstable equilibrium point (i.e., the Jacobian matrix of the dynamical system has only one eigenvalue with a positive real part). Its unstable manifold is a one-dimensional trajectory and converges to a pair of neighboring stable equilibrium points. If a decomposition point $y_d^j$ is found at step 706, the method proceeds to step 707; otherwise, the method proceeds to step 711.

At step 707, the method proceeds to set $y_0^j=y_d^j+\epsilon(y_d^j-y_s^i)$, where $\epsilon$ is a small number, and compute a new initial point $y_r^j$, which is in a next-tier stability region, by integrating the trajectory of the dynamical system for a number of steps starting from $y_0^j$.

At step 708, the method proceeds to apply the local optimizer using the initial point $y_r^j$ to compute an SEP $y_s^j$. At step 709, it is determined whether $y_s^j \in Y_c$, and if $y_s^j \in Y_c$, the method proceeds to step 711; otherwise, the method proceeds to step 710 to set $Y_c=Y_c \cup \{y_s^j\}$ and $Y_{new}^{i+1}=Y_{new}^{i+1} \cup \{y_s^j\}$ and then continues to step 711.

At step 711, the method proceeds to determine whether all directions have been searched by setting j=j+1 and checking whether j<=$m_i$. If j<=$m_i$ (that is, not all of the directions have been searched), the method proceeds to step 712 and then step 705 to search the next direction; otherwise, the method proceeds to step 713.

At step 713, it is determined whether $Y_{new}^i$ is non-empty. If $Y_{new}^i$ is non-empty, then the method proceeds to step 703 to search from a new $y_s^i$. Otherwise, the method proceeds to step 714.

At step 714, it is determined whether $Y_{new}^{i+1}$ is non-empty. If $Y_{new}^{i+1}$ is non-empty, then the method proceeds to set i=i+1 at step 715 and then to step 703 to search the directions in the next tier (i.e., the next outer tier). Otherwise, the method proceeds to step 716. At step 716, the method proceeds to output the complete set of SEPs (i.e., Yc) of the dynamical system.

As described above, the conventional MINLP solvers that can be enhanced by TRUST-TECH include the B&B method and its variants. B&B is a widely-used method for solving linear and nonlinear mixed integer programming (MIP) problems. B&B has been the prevailing method among the existing MINLP solvers for decades. B&B adopts the divide-and-conquer concept and systematically divides the given problem into a collection of easy sub-problems. By taking advantage of the solutions of sub-problems, the lower and upper bounds are progressively updated, which are crucial in determining which sub-problems to be discarded or to be remained for further branching. In this way, the computing burden for the whole solution procedure is alleviated.

The following description provides the details of the TRUST-TECH enhanced B&B related methods. The "B&B related method" herein refers to the B&B method or one of its variants (e.g., the B&R method or the B&C method). The B&B related method is one example of the MINLP solver referred to in FIG. 2-FIG. 6. Before describing the TRUST-TECH enhanced B&B related methods, it is helpful to explain the computations of the B&B related method. In the following, the algorithms for the B&B method and the B&R method are provided.

The Branch-and-Bound (B&B) Method. For convenience, the integer problem (21) and the relaxed continuous problem (2.2) are denoted by SI and SR, respectively. The problem (2.1) can be solved by B&B. The following Algorithm 1 presents an algorithm of the B&B method.

Algorithm 1: The Branch-and-Bound (B&B) Method

Input: the relaxed continuous problem SR, the initial upper bound Bu*

Output: the best discovered solution (i.e., the solution having the minimum object function values).

Algorithm:

Step 1) Initialize the list of unsolved sub-problems: L←{SR}, the incumbent integer solution y*←∅, and the current upper bound Bu←Bu*.

Step 2) Select a sub-problem S from L, and compute a feasible solution y of S by using a local solver.

Step 3) Apply a bounding operation to prune the search; that is, the solution value f(y) is compared with the current upper bound Bu. If f(y)<Bu, then go to Step 4; otherwise, go to Step 7.

Step 4) Determine whether the variable y is integral; that is, whether $y=(y_1, \ldots, y_n) \in Z^n$. If y is integral, then proceed to Step 5; otherwise, proceed to Step 6.

Step 5) Set y*=y and Bu=f(y), which is a tightened bound, and go to Step 7.

Step 6) Find a fractional coordinate $y_k'$ of y, and set $S_1=S \cap \{y, y_k' \geq \lceil y_k' \rceil\}$, $S_2=S \cap \{y, y_k' \leq \lfloor y_k' \rfloor\}$, and L=L∪{$S_1, S_2$}. Then, proceed to Step 7.

Step 7) If L≠∅, then go to Step 2; otherwise, stop the search procedure and output the best discovered solution y*.

The B&B method employs an implicit enumeration scheme which evaluates only a small portion of all of the possible solutions and discards other useless solutions by a pruning operation. The sub-problems generated by the branching operation are mutually exclusive. However, the collection of unsolved sub-problems may still keep growing and become computationally intractable in limited time, especially for problems of highly-nonlinear and nonconvex objective and/or constraint functions. In this regard, B&B can return a solution far away from the global optimal solution, which is also a common disadvantage shared by heuristic algorithms.

In an embodiment of the dynamical method for solving MINLP problems, the B&B method is incorporated by TRUST-TECH as the existing MINLP solver. TRUST-TECH enhances the B&B method carries out an extensive search. Compared to the conventional B&B, the TRUST-TECH enhanced B&B method finds distinct and improved integer solutions within limited time to thereby attain the global optimal solution to MINLP problems.

Different strategies are available when using TRUST-TECH to enhance the B&B method and the variants of the B&B method. TRUST-TECH can be successfully applied to improve the local solvers for continuous optimization problems. Hence, one consideration in adopting TRUST-TECH in B&B related methods is to implement and invoke the TRUST-TECH search procedure to enhance the local solver at step 7 of Algorithm 1. Such an implementation will generally result in better solutions to the sub-problem S. Nevertheless, it has been realized that the optimal integer solution of the integer problem SI (2.1) usually neither coincides with local optimal solutions to the associated relaxed continuous problem SR, nor coincides with the optimal solution to the sub-problem S. Indeed, the global optimal integer solution to the integer problem SI (2.1) can be far away from the global optimal solution to the corresponding relaxed continuous problem or sub-problems. Numerical simulations also indicate that the solution quality improvement introduced by TRUST-TECH of the continuous local solver in B&B makes little difference to the final integer solution. Conversely, such an implementation will result in increased computing-time when compared with the conventional B&B method.

It has been found that the B&B method can effectively solve convex MINLP problems or non-convex MINLP problems whose optimal solution is restricted to a stability region in the associated dynamical system. This advantage of the B&B method is enhanced when the B&B method is enhanced to search different stability regions. The above description explains how TRUST-TECH is applied to enhance B&B as a whole once B&B returns a feasible integer solution.

The Branch-and-Reduce (B&R) Method. The B&R method is a variant of B&B for solving linear and nonlinear MINLP problems. Similar to the B&B method, B&R also adopts the divide-and-conquer concept and systematically divides the given problem into a collection of easy sub-problems. By taking advantage of the solutions of sub-problems, the lower and upper bounds are progressively updated, which are crucial in determining which sub-problems to be discarded or to be remained for further branching. In this way, the computing burden for the whole solution procedure is alleviated.

For convenience, the integer program (2.1) and the relaxed continuous problem (2.2) are denoted by SI and SR, respectively. The problem (2.1) can be solved by B&R. The following Algorithm 2 presents a procedure of the B&R method.

Algorithm 2: The Branch-and-Reduce Method

Input: the relaxed continuous problem SR, the initial upper bound Bu*

Output: best discovered solution (i.e., the solution having the minimum object function values).

Algorithm:

Step 1) Initialize the list of unsolved sub-problems: L←{SR}, the incumbent integer solution y*←∅, and the current upper bound Bu←Bu*.

Step 2) Select a sub-problem S from L, and compute a feasible solution y of S by using a local continuous solver (also referred to as "local optimizer" or "local solver"). Examples of local solvers include, but are not limited to: the interior point method (IPM), the sequential quadratic programming (SQP), the augmented Lagrangian method, etc.

Step 3) Apply a lower bounding operation to produce a linear under-approximation of the sub-problem S and proceed to Step 4.

Step 4) Determine whether the variable y is integral; that is, whether $y=(y_1, \ldots, y_n) \in Z^n$. If y is integral, then proceed to Step 5; otherwise, proceed to Step 6.

Step 5) Determine whether the objective function is improved; that is, whether $f(y)<f(y^*)$. If $f(y)<f(y^*)$, set $y^*=y$ and Bu=f(y), which is a tightened bound, and proceed to Step 6; otherwise go to Step 10.

Step 6) Apply the upper bounding operation to prune the search; that is, the solution value f(y) is compared with the current upper bound Bu. If f(y)<Bu, then go to Step 7; otherwise, go to Step 10.

Step 7) Determine whether the variable y is integral; that is, whether $y=(y_1, \ldots, y_n) \in Z^n$. If y is integral, then proceed to Step 8; otherwise, proceed to Step 9.

Step 8) Set y*=y and Bu=f(y), which is a tightened bound, and go to Step 10.

Step 9) Find a fractional coordinate $y_k'$ of y, and set $S_1 = S \cap \{y, y_k' \geq \lceil y_k' \rceil\}$, $S_2 = S \cap \{y, y_k' \leq \lfloor y_k' \rfloor\}$, and $L = L \cup \{S_1, S_2\}$. Then, proceed to Step 10.

Step 10) If $L \neq \emptyset$, then go to Step 2; otherwise, stop the search procedure and output the best discovered solution y*.

FIG. 8 through FIG. 11 illustrate an embodiment of the TRUST-TECH enhanced B&B method, which is a dynamical method for solving MINLP problems. Although B&B method is described and shown, it is understood that any B&B variant, such as B&R or B&C, can be used. The TRUST-TECH enhanced B&B method can be implemented by the following conceptual procedure:

Step 1) Apply the B&B method to compute an integer solution of the integer problem SI of the form (2.1), as illustrated in FIG. 8.

Step 2) Compute the SEP which the integer solution converges to in the associated dynamical system of the relaxed continuous problem of the form (2.2); in other words, the integer solution is contained in the stability region of this SEP in the associated dynamical system, as illustrated in FIG. 9.

Step 3) Apply the TRUST-TECH search procedure to compute a collection Yc of multi-tier SEPs neighboring the SEP of step 2) in the associated dynamical system of the relaxed continuous problem of the form (1.1), as illustrated in FIG. 10.

Step 4) Select an SEP in the collection Yc with a bounding operation, and starting from it compute another integer solution to the original MINLP problem SI using the B&B method, as illustrated in FIG. 11.

Step 2 through step 4 can be repeated multiple times to consistently improve the solution quality of the B&B method, until no improvement can be achieved or the restrictions imposed on the computing time or computational resources have been reached.

Figure 12:
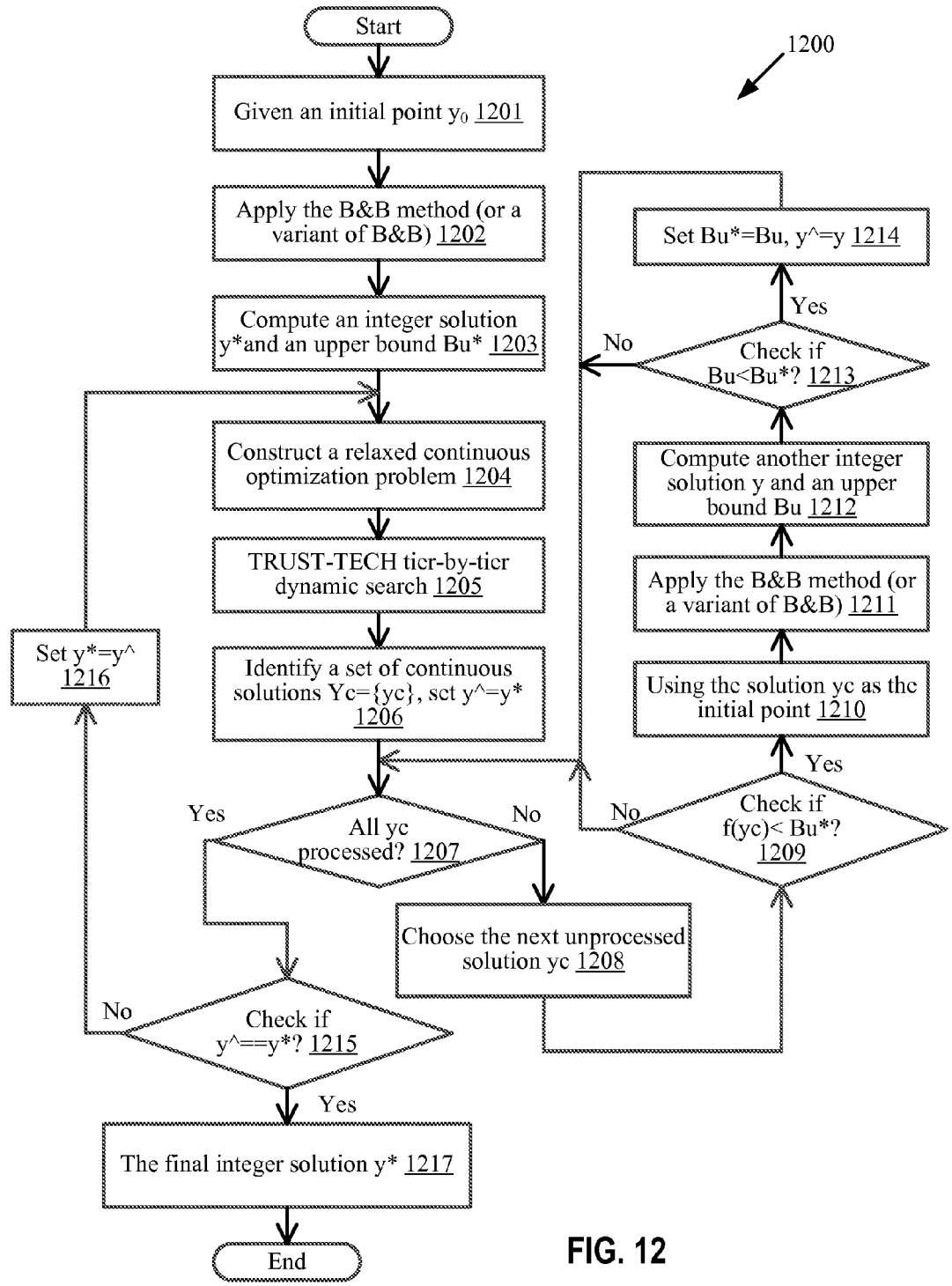
FIG. 12 illustrates a flow diagram of the second dynamical method for solving MINLP problems using the B&B related method according to one embodiment.

FIG. 12 illustrates an embodiment of the TRUST-TECH enhanced B&B method 1200. Although B&B method is described and shown, it is understood that any B&B variants, such as B&R or B&C, can be used. Each step of the TRUST-TECH enhanced B&B method corresponds to a step of FIG. 6. The method 1200 can be executed by software, hardware, firmware, or a combination thereof. In one embodiment, the TRUST-TECH enhanced B&B method 1200 is executed by a processing system such as a computer system.

According to FIG. 12, in one embodiment, the method 1200 begins with a given arbitrary initial point $y_0$ at step 1201. The method proceeds to apply the B&B method at step 1202 to compute a feasible solution (e.g., an integer solution) y* and an upper bound Bu* to the integer problem (2.1) at step 1203, where all integral variables are assigned proper integer values and all constraints are satisfied. At step 1204, the method then proceeds to construct a relaxed continuous problem of the form (2.2) for the integer problem (2.1).

Subsequently, at step 1205, the method proceeds to perform a deterministic, tier-by-tier dynamical search procedure; e.g., the TRUST-TECH dynamical search method described above with reference to FIG. 7. Based on results of the TRUST-TECH dynamical search, the method proceeds to identify a complete set of local optimal solutions Yc={yc} to the relaxed continuous problem from the set of SEPs, and sets $\hat{y}=y^*$ at step 1206. At step 1207, the method proceeds to determine whether all local optimal solutions in Yc have been processed. If the set Yc is empty or all solutions in Yc have been processed, the method proceeds to step 1215; otherwise the method proceeds to step 1208. At step 1208, a solution yc in Yc is chosen and Yc is updated by removing yc from it. At step 1209, the method determines whether the objective value is acceptable; that is, whether f(yc)<Bu*. If f(yc)<Bu*, the method proceeds to step 610; otherwise, the method proceeds to step 1207.

At step 1210, the chosen solution yc in Yc is used as the initial point. The method applies the B&B method at step 1211 to compute another integer solution y and an upper bound Bu to the integer problem (2.1) at step 1212. At step 1213, it is determined whether or not the obtained integer solution is better than the current best solution; that is, whether Bu<Bu*. If Bu<Bu*, the method proceeds to step 1214; otherwise, the method proceeds to step 1207.

At step 1214, the method proceeds to update the current best solution by setting Bu*=Bu and yˆ=y. The method then proceeds to step 1207.

If it is determined at step 1207 that all local optimal solutions in Yc have been processed, it is further determined at step 1215 whether or not the current best solution has been changed; that is, whether yˆ==y*. If yˆ==y*; that is, the best solution has been changed, the method proceeds to step 1216; otherwise, the method proceeds to step 1217.

At step 1216, the method proceeds to set y*=yˆ. The method then proceeds to step 1204 to start the next iteration of the global optimization. At step 1217, the entire search is terminated and the final integer solution y* is generated as output.

Numerical Examples. For simplicity, in the following description TT-B&B and TT-B&R are used as abbreviations for the TRUST-TECH enhanced B&B method and TRUST-TECH enhanced B&R method, respectively.

We examine the performance of the TT-B&B method for global optimization of benchmark MINLP problems with non-convex objective functions. These benchmark functions are all non-negative over the real space $R^n$ and have global minimum 0 in $Z^n$. When implementing the TT-B&B method, we have fixed the maximum number of iterations, that is, Nmax=3. Moreover, due to the exponential growth of the unsolved sub-problems, computations of the B&B method may become intractable. To avoid an endless search by the B&B procedure for highly nonlinear problem, an upper limit 600n, where n is the dimension of the problem, is assigned to the number of sub-problems to be solved, and the search is forced to be terminated if this limit is reached. It is understood that a benchmark MINLP problem with different properties, a different maximum number of iterations and/or a different upper limit for the number of sub-problems may be chosen for the performance evaluation.

Performance of the TT-B&B method is compared with the performance of the B&B method. To facilitate the comparison, the computation has been carried out for multiple (e.g., 10) independent runs by these two methods. During each run, the same initial point is assigned to both methods. To assess the solution quality, the mean value and the standard deviation (std.) are computed over the solutions obtained in the 10 runs.

In the numerical simulations, the B&B method and the TT-B&B method are used to solve the pure integer programming problems, where the objective function f is the Rosenbrock function (2.3) of dimension n:

$$\min_{(y_1,\ldots,y_n)\in Z^n} f(y)=\Sigma_{i=1}^{n-1}((y_i-1)^2+100\cdot(y_{i+1}-y_i^2)^2)y= \quad (2.3)$$

The two methods are tested using the Rosenbrock function of dimensions n=10, 30, and 100. Although the Rosenbrock function of specific dimensions is used in the performance comparison, it is understood that other MINLP problems and different dimensions may be used. Simulation results show that the TT-B&B method significantly improves the solution quality as compared to the B&B method. It is observed that the solution quality of the B&B method degrades significantly as the problem complexity increases, and the solutions are far away from the global optimal solution. In contrast, the TT-B&B method can successfully achieve the global optimal solution, which is 0, on the Rosenbrock function with n=10 and 30. For the most complex test function with n=100, the TT-B&B method can still achieve solutions close to the global optimal solution. Furthermore, as suggested by the standard deviation of the objective values, the results returned by the TT-B&B method are much more consistent when compared to the B&B method. In other words, the TT-B&B method is very robust for MINLP problems of different complexities. On the computational efficiency, the TT-B&B method typically consumes more CPU time than that by the B&B method. This is because that the TT-B&B method consists of a whole B&B procedure and additional time is required in order to carry out the TRUST-TECH search procedure and the B&B process. However, it is worthwhile noting that the increase in computing time by the TT-B&B method is negligible in many runs, in contrast with the resulting improvement on the solution quality.

In the numerical simulations, the B&R method and the TT-B&R method have been applied to solve the pure integer programming problems, where the objective function f is the function (2.4) of dimension n:

$$\min \quad f(g(y)) = \frac{1}{10}g^2(g-10)(g+13) \quad (2.4)$$

$$\text{with} \quad g(y) = \sum_{k=1}^{10}(-1)^{k-1}\cdot\frac{\left(\sqrt{\frac{1}{n}\sum_{i=1}^{n}x_i^2}-8.5\right)^{2k-1}}{(2k-1)!}$$

$$y = (y_1, \ldots, y_n) \in [-17, -16, \ldots, 0, \ldots, 16, 17]^n$$

From the simulation results, it can be observed that the solution quality of the conventional B&R method degrades significantly as the problem complexity increases, and the solutions are far away from the global optimal solution. In contrast, the TT-B&R method can consistently achieve much improved solutions for the objective function with n=1, 3, and 5. Although the function (2.4) of specific dimensions is used in the performance comparison, it is understood that other MINLP problems and different dimensions may be used.

Furthermore, as suggested by the standard deviation of the objective values, the results returned by the TT-B&R method are much more consistent. In other words, the TT-B&R method is very robust for MINLP problems of different complexities. On the computational efficiency, the TT-B&R method typically consumes more CPU time than that by the B&R method. This is because that the TT-B&R method consists of a whole B&R procedure and additional time is required in order to carry out the TRUST-TECH search procedure and the B&R process. However, it is worthwhile noting that the increase in computing time by the TT-B&R method is negligible in many runs, in contrast with the resulting improvement on the solution quality.

In summary, the TRUST-TECH enhanced methods have the following distinctive features:

1) The existing MINLP solvers (such as B&B and its variants) can solve an MINLP problem provided that the problem is convex or the integer solution is restricted to a stability region in the dynamical system associated with the relaxed continuous problem. TRUST-TECH leads the search from a stability region where an integer solution is located to another nearby stability region, which contains one or more other integer solutions. Within this nearby stability region, an existing MINLP solver can be used to compute one or more other integer solutions.

2) Since an optimal integer solution has been computed at the early stage, its objective value can be used as the initial upper bound for succeeding B&B (or its variant) searches. Imposing this upper bound will result in most of the multi-tier SEPs being identified as inferior and thus being discarded. In this manner, the upper bound for the B&B (or its variant) method can be progressively tightened.

3) As the major contribution of the tightened upper bound, the integer solution returned by the TRUST-TECH enhanced method can achieve better solutions. In other words, the TRUST-TECH method can consistently improve the solution quality of the existing MINLP solvers, including the B&B method and its variants.

4) The TRUST-TECH dynamic search procedure is parallel in nature; that is, searches in different directions can be performed in parallel. Therefore, the TRUST-TECH enhanced method is ready for parallel implementations, so as to take full advantage of fast-growing hardware capabilities.

5) The above description uses the B&B (or its variant) method as examples of the existing MINLP solver. Nevertheless, the TRUST-TECH enhanced method is widely applicable, in that any other solution method or commercial solver for MINLP problems can be enhanced in a similar manner to achieve improved solution quality.

Embodiments of the techniques disclosed herein may be implemented in hardware, software, firmware, or a combination of such implementation approaches. In one embodiment, the methods described herein may be performed by a processing system. A processing system includes any system that has a processor, such as, for example; a digital signal processor (DSP), a microcontroller, an application specific integrated circuit (ASIC), or a microprocessor. One example of a processing system is a computer system.

Figure 13:
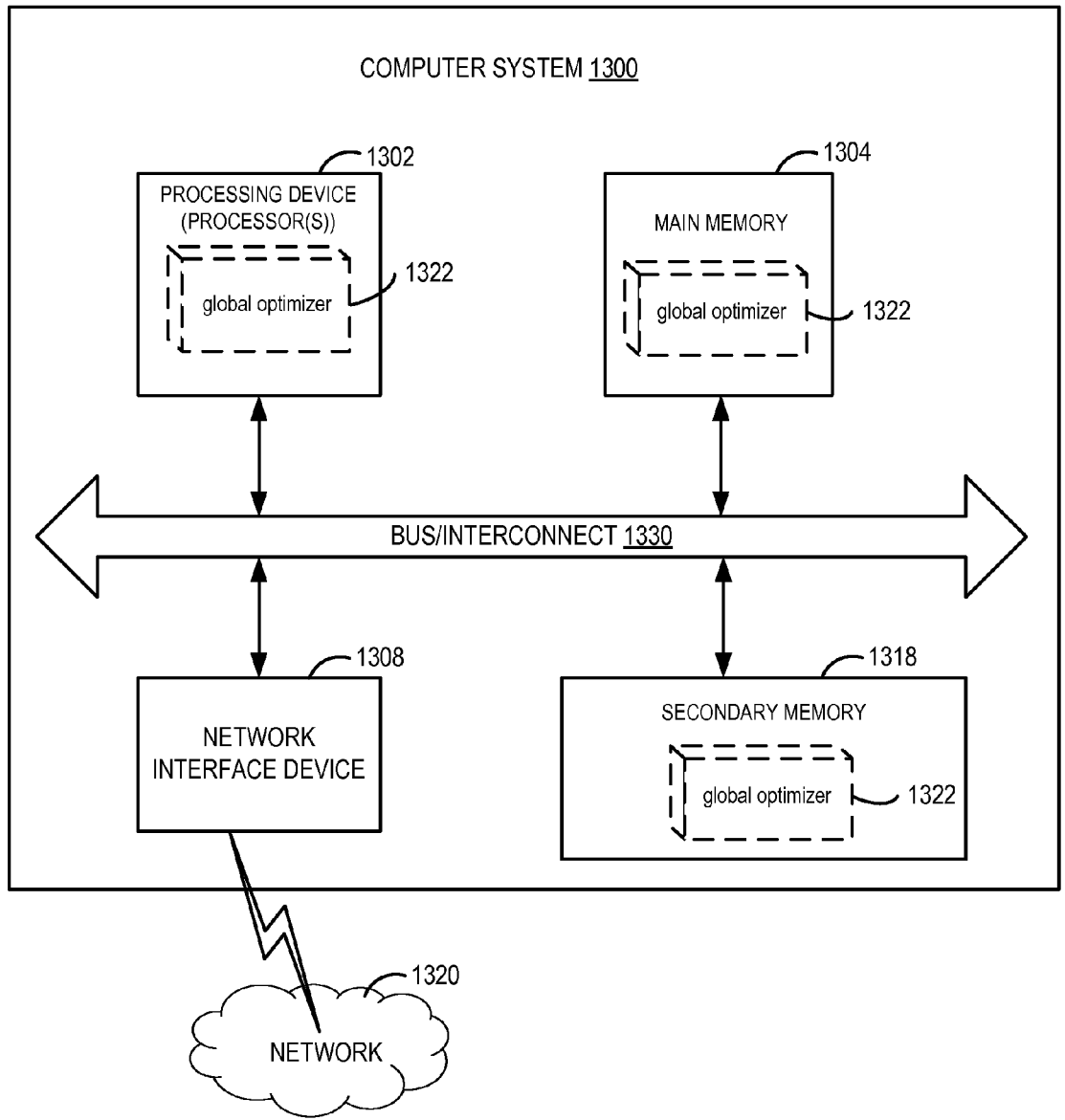
FIG. 13 is a block diagram illustrating an example of a computer system according to one embodiment.

FIG. 13 illustrates a diagrammatic representation of a machine in the form of a computer system 1300 within which a set of instructions, for causing the machine to perform any one or more of the methodologies discussed herein, may be executed. The computer system 1300 may be a server computer, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The computer system 1300 includes a processing device 1302. The processing device 1002 represents one or more general-purpose processors, each of which can be: a microprocessor, a central processing unit (CPU), a multicore system, or the like. More particularly, the processing device 1302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1302 may also be one or more special-purpose processing devices such as an application specific integrated circuit (ASIC), a field programmable gate array (FPGA), a digital signal processor (DSP), network processor, or the like. In one embodiment, the processing device 1302 is adapted to execute the operations of a global optimizer 1322, which performs the methods described in connection with FIG. 6, FIG. 7, FIG. 12 and/or FIG. 14 for generating a global optimal solution for an MINLP problem.

In one embodiment, the processor device 1302 is coupled to one or more memory devices such as: a main memory 1304 (e.g., read-only memory (ROM), flash memory, dynamic random access memory (DRAM), a secondary memory 1318 (e.g., a magnetic data storage device, an optical magnetic data storage device, etc.), and other forms of computer-readable media, which communicate with each other via a bus or interconnect. The memory devices may also different forms of read-only memories (ROMs), different forms of random access memories (RAMs), static random access memory (SRAM), or any type of media suitable for storing electronic instructions. In one embodiment, the memory devices may store the code and data of the global optimizer 1322. In the embodiment of FIG. 13, the global optimizer 1322 may be located in one or more of the locations shown as dotted boxes and labeled by the reference numeral 1322.

The computer system 1300 may further include a network interface device 1308. A part or all of the data and code of the global optimizer 1322 may be transmitted or received over a network 1320 via the network interface device 1308. Although not shown in FIG. 13, the computer system 1300 also may include user input/output devices (e.g., a keyboard, a touchscreen, speakers, and/or a display).

In one embodiment, the global optimizer 1322 can be implemented using code and data stored and executed on one or more computer systems (e.g., the computer system 1300). Such computer systems store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices as shown in FIG. 13 as 1304 and 1318) and transitory computer-readable transmission media (e.g., electrical, optical, acoustical or other form of propagated signals—such as carrier waves, infrared signals). A non-transitory computer-readable medium of a given computer system typically stores instructions for execution on one or more processors of that computer system. One or more parts of an embodiment of the invention may be implemented using different combinations of software, firmware, and/or hardware.

Figure 14:
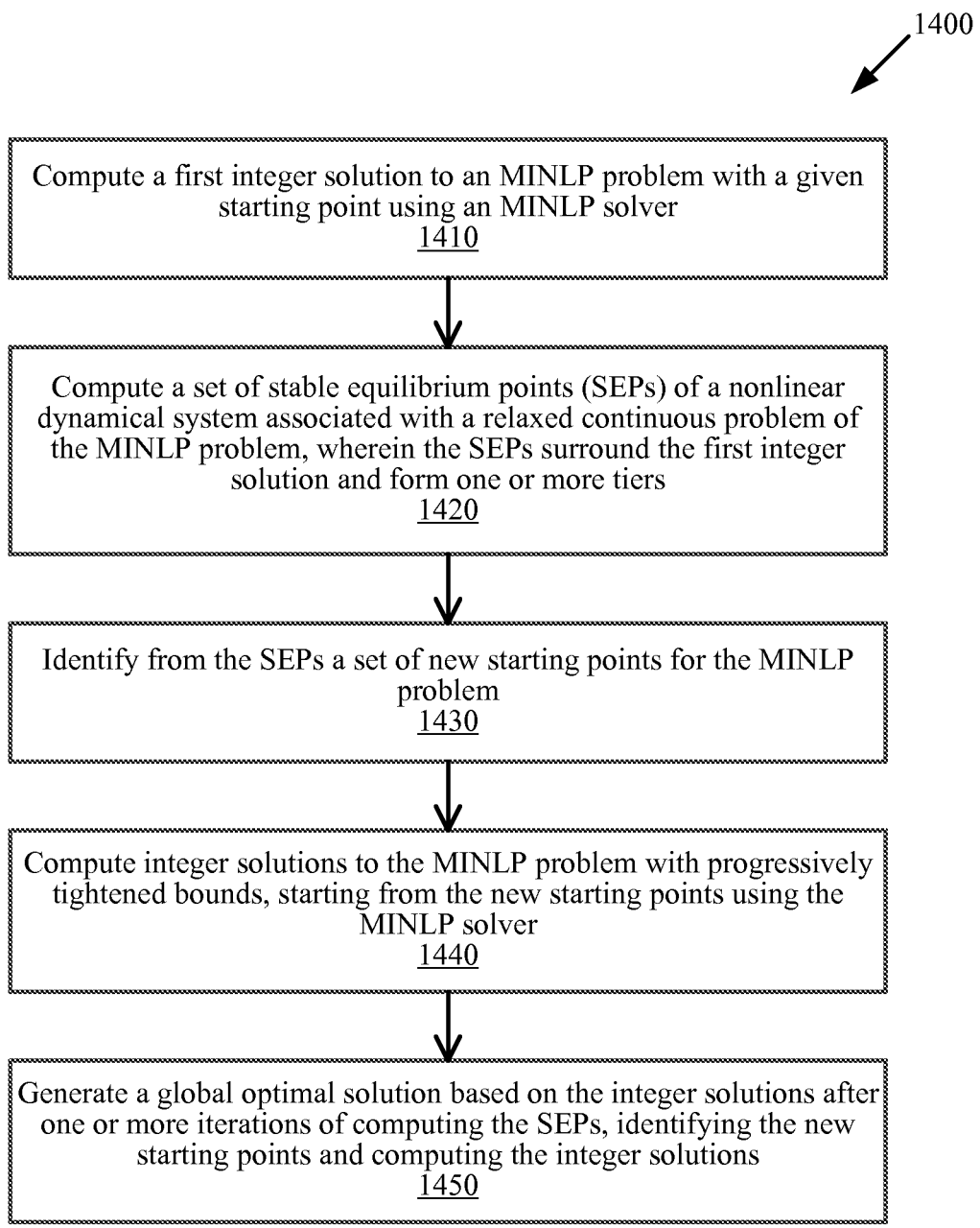
FIG. 14 is a flow diagram illustrating a method for generating a global optimal solution to an MINLP problem according to one embodiment.

FIG. 14 is a flow diagram illustrating an example of a method 1400 for generating a global optimal solution to an MINLP problem wherein a part or all of optimization variables of the MINLP problem are restricted to have discrete values. The method 1400 can be executed by software, hardware, firmware, or a combination thereof. In one embodiment, the method 1400 is executed by a processing system such as a computer system.

According to FIG. 14, in one embodiment, the method 1400 begins with computing a first integer solution to the MINLP problem with a given starting point using an MINLP solver (block 1410). The method proceeds to compute a set of stable equilibrium points (SEPs) of a nonlinear dynamical system associated with a relaxed continuous problem of the MINLP problem, wherein the SEPs surround the first integer solution and form one or more tiers (block 1420); identify from the SEPs a set of new starting points for the MINLP problem (block 1430); compute integer solutions to the MINLP problem with progressively tightened bounds, starting from the new starting points using the MINLP solver (block 1440); and generate the global optimal solution based on the integer solutions after one or more iterations of computing the SEPs, identifying the new starting points and computing the integer solutions (i.e., one or more iterations of the operations of blocks 1420, 1430 and 1440) (block 1450).

The operations of the methods of FIG. 6, FIG. 7, FIG. 12 and FIG. 14 have been described with reference to the exemplary embodiment of FIG. 13. However, it should be understood that the operations of the methods of FIG. 6, FIG. 7, FIG. 12 and FIG. 14 can be performed by embodiments of the invention other than those discussed with reference to FIG. 13, and the embodiment discussed with reference to FIG. 13 can perform operations different from those discussed with reference to the methods of FIG. 6, FIG. 7, FIG. 12 and FIG. 14. While the methods of FIG. 6, FIG. 7, FIG. 12 and FIG. 14 show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A computer-implemented method for generating a global optimal solution to a mixed integer nonlinear programming (MINLP) problem wherein a part or all of optimization variables of the MINLP problem are restricted to have discrete values, the method comprising:
   computing by a computer system a first integer solution to the MINLP problem with a given starting point using an MINLP solver;
   computing a set of stable equilibrium points (SEPs) of a nonlinear dynamical system associated with a relaxed continuous problem of the MINLP problem, wherein the SEPs surround the first integer solution and form one or more tiers;
   identifying from the SEPs a set of new starting points for the MINLP problem;
   computing integer solutions to the MINLP problem with progressively tightened bounds, starting from the new starting points using the MINLP solver; and
   generating by the computer system the global optimal solution based on the integer solutions after one or more iterations of computing the SEPs, identifying the new starting points and computing the integer solutions.

2. The method of claim 1, wherein the MINLP solver is a Branch-and-Bound method, a Branch-and-Reduce method, or another existing MINLP solver.

3. The method of claim 1, wherein computing the set of SEPs further comprises:
   constructing the nonlinear dynamical system such that each of local optimal solutions to the relaxed continuous problem corresponds to a distinct SEP of the nonlinear dynamical system.

4. The method of claim 3, wherein each of the new starting points is one of the local optimal solutions that produces a tightened upper bound for the MINLP problem.

5. The method of claim 1, wherein computing the set of SEPs further comprises:
   computing a first SEP to which the first integer solution converges in the nonlinear dynamical system; and
   applying a dynamical search method, in a deterministic and tier-by-tier manner, to compute the set of SEPs neighboring the first SEP in the nonlinear dynamical system, wherein the set of SEPs are multi-tiered.

6. The method of claim 1, wherein computing the set of SEPs further comprises:
   computing a first set of search directions for an inner tier of stability regions;
   computing the SEPs in each of the first set of search directions;
   computing a second set of search directions for an outer tier of stability regions; and
   computing the SEPs in each of the second set of search directions.

7. The method of claim 6 further comprising: computing the SEPs in one or more of the search directions in parallel.

8. The method of claim 1, wherein the MINLP problem is associated with an objective function and one or more constraint functions, wherein at least one of the objective function and the constraint functions is nonlinear and nonconvex.

9. A system for generating a global optimal solution to a mixed integer nonlinear programming (MINLP) problem wherein a part or all of optimization variables of the MINLP problem are restricted to have discrete values, the system comprising:
   one or more processors; and
   one or more memory devices coupled to the one or more processors, wherein the one or more processors are adapted to perform operations of a global optimizer to:
   compute a first integer solution to the MINLP problem with a given starting point using an MINLP solver;
   compute a set of stable equilibrium points (SEPs) of a nonlinear dynamical system associated with a relaxed continuous problem of the MINLP problem, wherein the SEPs surround the first integer solution and form one or more tiers;
   identify from the SEPs a set of new starting points for the MINLP problem;
   compute integer solutions to the MINLP problem with progressively tightened bounds, starting from the new starting points using the MINLP solver; and
   generate the global optimal solution based on the integer solutions after one or more iterations of computing the SEPs, identifying the new starting points and computing the integer solutions.

10. The system of claim 9, wherein the MINLP solver is a Branch-and-Bound method, a Branch-and-Reduce method, or another existing MINLP solver.

11. The system of claim 9, wherein the one or more processors are adapted to perform the operations of the global optimizer to:
   construct the nonlinear dynamical system such that each of local optimal solutions to the relaxed continuous problem corresponds to a distinct SEP of the nonlinear dynamical system, wherein each of the new starting points is one of the local optimal solutions that produces a tightened bound for the MINLP problem.

12. The system of claim 9, wherein the one or more processors are adapted to perform the operations of the global optimizer to:
   compute a first SEP to which the first integer solution converges in the nonlinear dynamical system; and
   apply a dynamical search method, in a deterministic and tier-by-tier manner, to compute the set of SEPs neighboring the first SEP in the nonlinear dynamical system, wherein the set of SEPs are multi-tiered.

13. The system of claim 9, wherein the one or more processors are adapted to perform the operations of the global optimizer to:
   compute a set of search directions for a next tier of stability regions; and compute the SEPs in one or more of the search directions in parallel.

14. The system of claim 9, wherein the MINLP problem is associated with an objective function and one or more constraint functions, wherein at least one of the objective function and the constraint functions is nonlinear and nonconvex.

15. A non-transitory computer readable storage medium including instructions that, when executed by a processing system, cause the processing system to perform a method for generating a global optimal solution to a mixed integer nonlinear programming (MINLP) problem wherein a part or all of optimization variables of the MINLP problem are restricted to have discrete values, the method comprising:

computing a first integer solution to the MINLP problem with a given starting point using an MINLP solver;

computing a set of stable equilibrium points (SEPs) of a nonlinear dynamical system associated with a relaxed continuous problem of the MINLP problem, wherein the SEPs surround the first integer solution and form one or more tiers;

identifying from the SEPs a set of new starting points for the MINLP problem;

computing integer solutions to the MINLP problem with progressively tightened bounds, starting from the new starting points using the MINLP solver; and generating the global optimal solution based on the integer solutions after one or more iterations of computing the SEPs, identifying the new starting points and computing the integer solutions.

16. The non-transitory computer readable storage medium of claim 15, wherein the MINLP solver is a Branch-and-Bound method, a Branch-and-Reduce method, or another existing MINLP solver.

17. The non-transitory computer readable storage medium of claim 15, wherein the method further comprises:

constructing the nonlinear dynamical system such that each of local optimal solutions to the relaxed continuous problem corresponds to a distinct SEP of the nonlinear dynamical system, wherein each of the new starting points is one of the local optimal solutions that produces a tightened bound for the MINLP problem.

18. The non-transitory computer readable storage medium of claim 15, wherein the method further comprises:

computing a first SEP to which the first integer solution converges in the nonlinear dynamical system; and applying a dynamical search method, in a deterministic and tier-by-tier manner, to compute the set of SEPs neighboring the first SEP in the nonlinear dynamical system, wherein the set of SEPs are multi-tiered.

19. The non-transitory computer readable storage medium of claim 15, wherein the method further comprises:

computing a set of search directions for a next tier of stability regions; and computing the SEPs in one or more of the search directions in parallel.

20. The non-transitory computer readable storage medium of claim 15, wherein the MINLP problem is associated with an objective function and one or more constraint functions, wherein at least one of the objective function and the constraint functions is nonlinear and nonconvex.

* * * * *